2,868,797
Patented Jan. 13, 1959

2,868,797

4-NITROPYRIDINE-ALKANOL, N-OXIDES

Francis E. Cislak, Indianapolis, Ind., assignor to Reilly Tar & Chemical Corporation, Indianapolis, Ind., a corporation of Indiana No Drawing. Application May 9, 1958
Serial No. 734,117

7 Claims. (Cl. 260—297)

This invention relates to 4-nitropyridine-alkanol, N-oxides and to the process of making them. The 4-nitropyridine-alkanol, N-oxides, which are the subject of this application, have the following general formula:

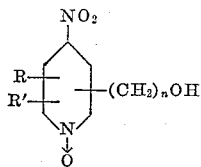

where $n$ is 1 to 3, R and R' are hydrogen or lower alkyl.

In my U. S. Patent 2,735,851, issued February 21, 1956, I describe the manner of making alkanolypyridine-N-oxides. I have now found that if I esterify the alkanol-pyridine-N-oxides, I can nitrate them to obtain the corresponding 4-nitropyridine-alkanol, N-oxide.

The following specific examples illustrate the manner in which my process may be conducted.

EXAMPLE 1

*2-(4-nitropyridine)-ethan-2-ol, N-oxide*

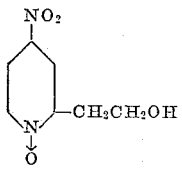

Eighty grams of the acetate of 2-pyridine-ethan-2-ol, N-oxide are dissolved in about 500 cc. of warm glacial acetic acid. The resulting solution is heated to a temperature of about 50° C. and while stirring it, there is added to the solution about 100 cc. of concentrated nitric acid (sp. gr. 1.50). The addition of the nitric acid is made in small portions during the course of about 15–25 minutes. After all the nitric acid has been added, the solution is heated under reflux conditions for about two hours. Then the solution is concentrated by distilling off most of the acetic acid and water. The 2-(4-nitropyridine)-ethan-2-ol, N-oxide remains in the residue as the acetate. It may be recovered from this residue by conventional hydrolysis.

Instead of using the acetate of 2-ethanolpyridine-N-oxide, I may start with 2-pyridine-ethan-2-ol, convert it to the -N-oxide and without isolation, proceed to nitrate it.

One of the more important uses of my 4-nitropyridine-alkanol, N-oxides is in the preparation of 4-aminopyridine-alkanols. My process of preparing 4-nitropyridine-alkanol, N-oxides may be adapted so as to proceed directly from the alkanolpyridine to the 4-aminopyridine-alkanol. Such a procedure is given in Example 2 below.

The 4-aminopyridine-alkanols are useful in inhibiting the action of non-oxidizing inorganic acid upon steel. A 5% solution of my 4-aminopyridine-alkanols in high-boiling coal-tar bases is particularly effective in inhibiting the action of dilute sulfuric acid upon steel. Inhibition to the extent of 90% or more may be obtained.

My 4-aminopyridine-ethanols may be used to make 4-amino-vinylpyridines. The equation below portrays the dehydration of 4-aminopyridine-ethan-2-ol to 4-amino-2-vinylpyridine:

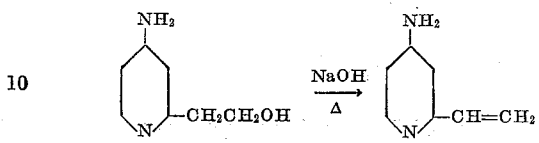

My 4-amino-vinylpyridines are useful in the preparation of polymers and co-polymers. When copolymerized with acrylonitrile, they yield a product particularly useful for the manufacture of synthetic fibers; the presence of the pyridine-ring nitrogen and also of the amino group imparts good dyeing qualities to the acrylonitrile 4-amino-vinyl-pyridine fibers.

EXAMPLE 2

*2-(4-aminopyridine)-ethan-2-ol*

A. 2-pyridine-ethan-2-ol, N-oxide acetate. A solution of 125 grams of 2-pyridine-ethan-2-ol and about 200 grams of acetic anhydride are slowly warmed to about 75° C. and maintained at this temperature for about one hour. Then the solution is heated under reflux conditions for about two hours. Now there is added about 200 grams of acetic acid and 50 cc. of water. The resulting solution is refluxed for about one hour and is then cooled to about 75° C. To the resultant solution of 2-pyridine-ethan-2-ol acetate there is added about 150 parts of hydrogen peroxide (50%). The hydrogen peroxide is preferably added in small portions during a four-hour period. The temperature of the solution is maintained at 75° C. during the addition of the hydrogen peroxide. After all of the hydrogen peroxide has been added, the solution is maintained at a temperature of 75° C. to 85° C. for an additional 6–10 hours. Then the temperature of the solution is raised to about 95° C. and paraformaldehyde is added to destroy any unreacted hydrogen peroxide. The peroxide free solution is concentrated by distilling off the water and most of the acetic acid. Glacial acetic acid is added to the residue to bring the volume of the resulting solution to about 600 cc.

B. 2-(4-nitropyridine)-ethan-2-ol, N-oxide acetate. The acetic acid solution of 2-pyridine-ethan-2-ol, N-oxide acetate formed in (A) above is heated to a temperature of about 50° C. and while stirring it, there is added to this solution about 150–200 cc. of concentrated nitric acid (sp. gr. 1.42–1.50); the addition is made in small portions during the course of about 20–30 minutes. After all of the nitric acid has been added, the solution is heated under reflux conditions for about two hours. The excess nitric acid is decomposed by adding formic acid to the solution.

C. 2-(4-aminopyridine)-ethan-2-ol. The solution of 2-(4-nitropyridine)-ethan-2-ol, N-oxide acetate formed in (B) above is heated to about 100° C. and to the hot solution there is added about 400 grams iron powder. While maintaining the solution temperature at about 100° C., the mixture is stirred for about 4–6 hours.

The 2-(4-aminopyridine)-ethan-2-ol formed during the reaction is recovered from the reaction mixture in any convenient manner. One such convenient manner is as follows: The reaction mixture is diluted with water, the pH adjusted to 10–11 with sodium hydroxide. The resulting mixture is extracted with about 1,000 cc. of ether. The ether extract contains the acetate of 2-(4-aminopyridine)-ethan-2-ol. To the extract there is added about 500 cc. of 10% sodium hydroxide, the ether is evaporated, and the residue refluxed for about six hours to hydrolyse the acetate to the 2-(4-aminopyridine)-ethan-2-ol.

EXAMPLE 3

*2-(4-nitro-5-ethylpyridine)-ethan-2-ol, N-oxide*

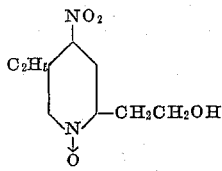

The procedure of Example 1 is repeated save that the acetate of 2,5-ethylpyridine-ethan-2-ol, N-oxide is used in place of the 2-pyridine-ethan-2-ol, N-oxide acetate and the product recovered is 2-(4-nitro-5-ethylpyridine)-ethan-2-ol, N-oxide.

EXAMPLE 4

*3-(4-nitropyridine)-propan-3-ol, N-oxide*

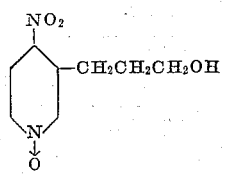

The procedure of Example 1 is repeated save that the acetate of 3-pyridine-propan-3-ol, N-oxide is used in place of the 2-pyridine-ethan-2-ol, N-oxide acetate and the product recovered is 3-(4-nitropyridine)-propan-3-ol, N-oxide.

EXAMPLE 5

*2-(4-nitropyridine)-propan-3-ol, N-oxide*

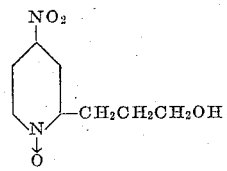

The procedure of Example 1 is repeated save that the acetate of 2-pyridine-propan-3-ol, N-oxide is used in place of the 2-pyridine-ethan-2-ol, N-oxide acetate and the product recovered is 2-(4-nitropyridine)-propan-3-ol, N-oxide.

EXAMPLE 6

*2-(4-nitro-3,6-dimethylpyridine)-ethan-2-ol, N-oxide*

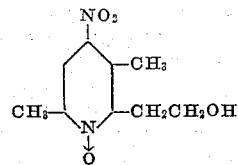

The procedure of Example 1 is repeated save that the acetate of 2-3,6-dimethylpyridine-ethan-2-ol, N-oxide is used in place of the 2-pyridine-ethan-2-ol, N-oxide acetate and the product recovered is 2-(4-nitro-3,6-dimethylpyridine)-ethan-2-ol, N-oxide.

EXAMPLE 7

*3(4-nitropyridyl)-carbinol-N-oxide*

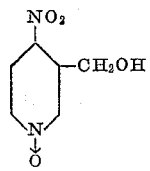

The procedure of Example 1 is repeated save that the acetate of 3-pyridylcarbinol, N-oxide is used in place of the 2-pyridine-ethan-2-ol, N-oxide acetate and the product recovered is 3(4-nitropyridyl)-carbinol-N-oxide.

This application is a continuation-in-part of Serial Number 667,051, filed June 20, 1957, now abandoned.

I claim as my invention:

1. 4-nitropyridine-alkanol, N-oxides having the following general formula:

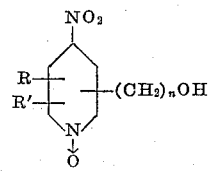

where $n$ is an integer selected from the group consisting of 1, 2, and 3, and R and R' are selected from the class consisting of hydrogen and lower normal alkyl.

2. The compound 2-(4-nitropyridine)-ethan-2-ol, N-oxide.

3. The compound 2-(4-nitropyridine)-propan-3-ol, N-oxide.

4. The compound 2-(4-nitro-5-ethyl)pyridine-ethan-2-ol, N-oxide.

5. The compound 3-(4-nitropyridine)-propan-3-ol, N-oxide.

6. The compound 3(4-nitropyridyl)-carbinol-N-oxide.

7. The process of preparing the compounds of claim 1 which comprises reacting an acetic acid solution of a pyridine-alkanol, N-oxide acetate with nitric acid and recovering 4-nitropyridine-alkanol, N-oxide.

No references cited.